Dec. 29, 1959

C. WHEATLEY 2,918,934

CHECK VALVE

Filed Aug. 13, 1956

INVENTOR.
Charles Wheatley
BY

ATTORNEY

United States Patent Office 2,918,934
Patented Dec. 29, 1959

2,918,934

CHECK VALVE

Charles Wheatley, Tulsa, Okla.

Application August 13, 1956, Serial No. 603,715

1 Claim. (Cl. 137—527.2)

This invention relates to improvements in check valves and more particularly, but not by way of limitation, to an improved universal check valve for use in all types of flow lines.

The check valve art is an old and crowded one, and yet even in view of the years of utilization of check valves, the present day valves have certain disadvantages in that they are usually quite heavy and bulky and therefore expensive in construction and difficult for manual handling thereof during installations in a pipe line, or the like. Furthermore, the present day check valve is usually provided with a pivotal clapper member which provides an undesirable obstruction within the valve body during operation thereof. Pipe lines are today normally cleaned by means of a pipe line "pig" or scraper which is run longitudinally through the pipe line for scraping the inner periphery thereof. The obstruction provided by the valve clapper member precludes the passage of the scraper through the valve, and therefore creates a problem in the cleaning of the inside of the pipe line. This is of particular disadvantage in the oil industry wherein paraffin deposits accumulate relatively rapidly on the inner periphery of the pipe, thus requiring frequent cleaning thereof.

The present invention contemplates an improved check valve of a durable and light weight construction for greatly facilitating the handling and installation thereof, and yet providing for the flow of high pressure therethrough as required in the pipe line industry. The improved check valve of the invention is provided with a clapper member having a novel pivotal connection with the valve body for permitting the clapper member to be moved completely away from the valve inlet port in an open position thereof, thus providing for the passage of a pipe line scraper through the valve to facilitate the cleaning of the inner periphery of the pipe line. The novel valve is adapted for permanent installation within the pipe line by welding, or the like, thereby eliminating the bulky and heavy circumferential flange members or threaded members usually required for installation of present day valves. The working members of the valve are readily accessible from the top of the novel valve, and since provision is made for the cleaning of the interior of the pipe line, there is no need for removal of the valve from the pipe line. Thus, in a crowded art, the present invention provides an improved check valve which is of durable construction and a more efficient operation.

It is an important object of this invention to provide a check valve having a clapper member pivotally secured within the valve body in a manner to assure full opening of the valve for providing sufficient clearance for passage of a cleaning or scraping tool through the valve, thereby facilitating the cleaning of the inner periphery of the flow line in communication with the valve.

It is another object of this invention to provide a novel check valve of a light weight construction for facilitating the manipulation thereof during installation in a flow line, or the like, and yet capable of handling high pressure flow streams.

It is still another object of this invention to provide a novel check valve having a clapper member provided with a cam-like projection for assuring a full opening of the clapper member and precluding accidental dislodging of the clapper, thereby assuring an efficient operation of the valve.

It is a further object of this invention to provide a novel check valve adapted for permanent installation in a flow line by welding, or the like.

It is a still further object of this invention to provide a novel check valve which is durable and economical in construction and simple and efficient in operation.

Other objects and advantages of the invention will be evident from the following detailed description, read in conjunction with the accompanying drawings, which illustrate my invention.

Figure 1:
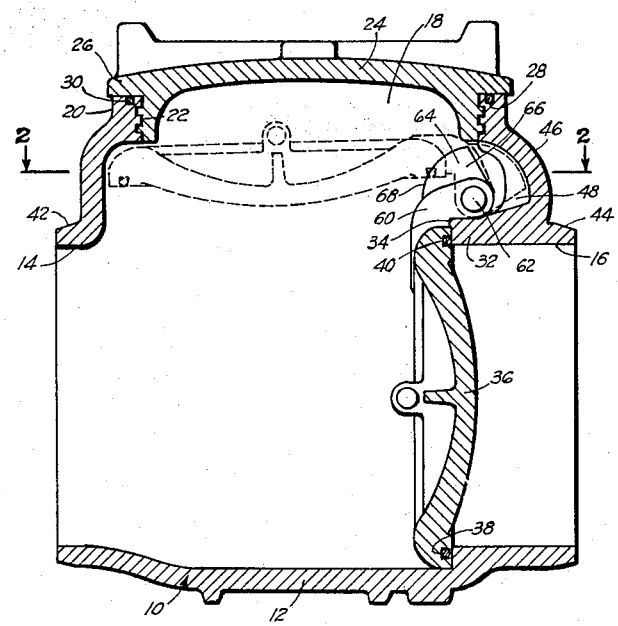
Figure 1 is a sectional elevational view of a check valve embodying the invention with portions shown in dotted lines for purposes of illustration.
Figure 4:
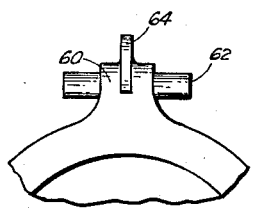
Figure 4 is an elevational view of a portion of the clapper member, particularly depicting the pivot connection member thereof.

Referring to the drawings in detail, reference character 10 refers in general to a check valve comprising a substantially cylindrical housing or body 12 having longitudinally aligned bores 14 and 16 providing for the flow of fluid through the valve. The port 16 is preferably considered to be the inlet port, and the port 14 is preferably considered to be the outlet port during an open position of the valve 10, thus the flow through the valve in an open position is from right to left as viewed in Fig. 1. The body 12 is further provided with a substantially centrally disposed bore 18 formed by an upstanding circular flange 20 provided at the top of the body 12, as viewed in Fig. 1. The flange member 20 is provided with internal threads 22 for receiving a threaded cover member 24 of substantially circular configuration. The cover member 24 is provided with an outwardly extending shoulder portion 26 for disposition adjacent the upper surface of the flange 20. An annular groove 28 is provided in the upper surface of the flange 20 for receiving a sealing member 30 to assure an adequate seal between the cover member 24 and the flange 20 for substantially precluding accidental loss of fluid therebetween.

An inwardly directed annular flange member 32 is provided within the valve body 12 conterminous with the inlet port 16. The inwardly directed end portion or face 34 of the flange 32 provides a seat for a circular substantially disc shaped clapper member 36 of an arcuate configuration in cross section. The clapper member 36 is provided with an annular groove 38 for receiving a sealing member 40 to assure an adequate seal between the clapper 36 and the seating portion 34 in a closed position of the valve 10. The clapper member 36 is pivotally secured above the flange 32 for alternate positions of open and closed thereagainst in a manner as will be hereinafter set forth.

The outer periphery of the valve body 12 is provided with oppositely disposed tapered portions 42 and 44 adjacent the bores 14 and 16, respectively, thereby adapting the valve body 12 for welding, or the like, between pipe line sections (not shown) in any suitable manner. Thus, the valve 10 is of a light weight construction for facilitating manipulation thereof during installation.

Figure 2:
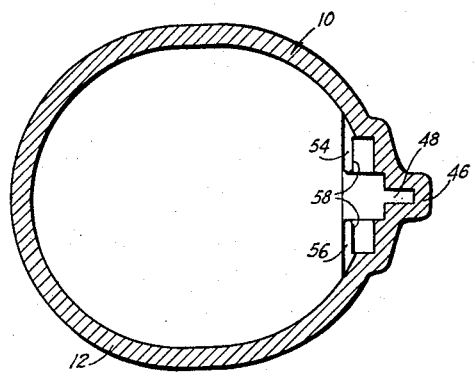
Figure 2 is a sectional view taken on line 2—2 of Fig. 1 with the clapper removed for clarity.
Figure 3:
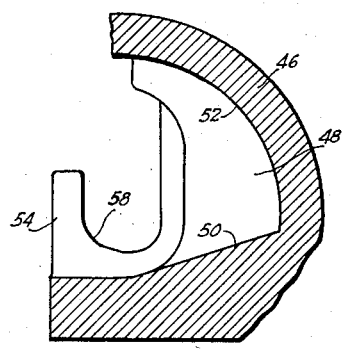
Figure 3 is an enlarged sectional detail view of the hanger portion of the valve body for receiving the clapper member.

The valve body 12 is provided with an outward bulge portion 46 interposed adjacent the flange members 20 and 32 to provide a recess 48 for receiving a cam-like projection 64. The recess 48 is provided with an angularly disposed bottom surface 50 (Fig. 3) and a substantially circular rear surface 52 for a purpose as will be hereinafter set forth. A pair of oppositely disposed upstanding inwardly directed flange members 54 and 56 (Fig. 2) are provided adjacent the top of the flange member 32 conterminous with the recess 48 to provide a hanger recess 58 for pivotally securing the clapper member 36 adjacent the flange 32 as will be hereinafter set forth.

The clapper member 36 is provided with an upwardly extending angled shank member 60 having a pin member 62 extending perpendicularly therethrough and adapted for disposition within the hanger recess 58. The cooperating pin member 62 and hanger recess portion 58 provide a pivotal connection of the clapper member adjacent the flange 32. The angled shape of the shank member 60 provides for an off-center position of gravity for the pivot axis with respect to the clapper member 36, thereby constantly urging the clapper toward a closed position against the seating portion 34 for assuring an efficient operation of the valve 10. A cam-like projection 64 having a substantially flat under surface 66 and an arcuate upper surface 68 is provided on the shank 60. The cam 64 is of substantially the same configuration as the cam-like projection recess 48. Thus, when the clapper member 36 is pivoted to an open position the flat surface 66 of the cam-like projection 64 will rest on the tapered surface 50 of the recess 48, thereby permitting the clapper to move to a full open or substantially horizontal position within the valve body 12, as shown in dotted lines in Fig. 1. The arcuate surface 68 of the cam-like projection 64 is substantially in contact with the cover member 24 and the arcuate portion 52 of the cam recess 48 as the clapper 36 moves to alternate positions of open and closed, and thus retains the pin member 62 within the hanger recess 58 to preclude accidental disengagement of the clapper 36 therefrom.

During operation of the valve 10, it is desired to direct the flow stream therethrough in a direction from right to left as viewed in Fig. 1. The influent enters the valve 10 through the inlet 16 and acts upon the clapper face exposed thereto, thus pivoting the clapper 36 toward an open position sufficiently for permitting passage of fluid therethrough and out the port 14. When the direction of the flow stream is reversed, the influent enters the valve 10 through the port 14 and strikes the clapper face exposed thereto for urging the clapper 36 into a sealed position on the seating member 34, thereby closing the valve 10. The clapper member 36 may be readily positioned within the valve body 12 for free pivotal movement therein by placing the pin member 62 within the hanger recess 58, and the clapper 36 can in no manner be removed from position thereon while the cover member 24 is secured to the valve housing. The free pivotal action of the clapper member provides for ease of operation of the valve 10, and the full opening feature provides sufficient clearance through the valve for the passage of pipe line cleaning tools, and the like.

From the foregoing, it will be apparent that the present invention provides a novel check valve of durable and light weight construction for facilitating the manipulation thereof. The improved valve is provided with a clapper member having a simple and efficient pivotal connection within the valve body which permits a full opening of the valve for passage therethrough of a pipe line scraper or cleaning tool. The cam-like projection and cooperating recess for receiving the cam-like projection provide for a free pivotal action of the valve clapper member, and preclude accidental dislodging of the clapper during the operation thereof. Thus, the novel improved valve is durable and economical in construction and simple and efficient in operation.

Changes may be made in the combination and arrangement of parts as heretofore set forth in the specification and shown in the drawings, it being understood that any modification in the precise embodiment of the invention may be made within the scope of the following claim without departing from the spirit of the invention.

I claim:

In a check valve, a housing, inlet and outlet ports provided in the housing for flow of fluid through the valve, an access port provided in the housing, a cover for the access port, an annular flange within the housing conterminous with the inlet port and providing a seating portion for the valve, a pivotal clapper disposed adjacent the flange for seating thereagainst in a closed position of the valve, an angled shank member provided on the clapper member, a pivot pin extending through the shank member, a pair of opposed upwardly extending inwardly directed flange members provided adjacent the annular flange providing a recess for receiving the pivot pin, a cam-like projection provided on the shank member and having an arcuate surface and a flat under surface, a recess for receiving said cam-like projection provided in the housing conterminous with the first mentioned recess for receiving the cam-like projection, said second mentioned recess having an arcuate side wall surface and an angularly disposed bottom surface to provide clearance for receiving the cam-like projection in a full open position of the clapper member, said second mentioned recess cooperating with the cover member and the cam-like projection for retaining the pivot pin within the recess therefor, said cam-like projection and second mentioned recess cooperating to provide for a full opening of the clapper member during an open position of the valve whereby flow through the valve is unrestricted, and sealing means provided on the clapper for assuring a sealing of the valve in a closed position thereof.

References Cited in the file of this patent

UNITED STATES PATENTS

| | | |
|---|---|---|
| 345,420 | Eckholme | July 13, 1886 |
| 1,982,189 | Anderson | Nov. 27, 1934 |
| 2,268,518 | Sonderman | Dec. 30, 1941 |

FOREIGN PATENTS

| | | |
|---|---|---|
| 17,947 | Great Britain | Sept. 5, 1899 |
| 13,022 | Great Britain | of 1906 |